United States Patent

[11] 3,566,111

| [72] | Inventor | Bruno Harm<br>Karlsruhe, Germany |
|---|---|---|
| [21] | Appl. No. | 737,970 |
| [22] | Filed | June 18, 1968 |
| [45] | Patented | Feb. 23, 1971 |
| [73] | Assignee | Siemens Aktiengesellschaft<br>Berlin and Munich, Germany |
| [32] | Priority | June 19, 1967 |
| [33] | | Germany |
| [31] | | P 15 72 829.7 |

[54] APPARATUS FOR VARYING THE DETECTOR SLIT WIDTH IN FULLY FOCUSING X-RAY SPECTROMETERS
7 Claims, 2 Drawing Figs.

| [52] | U.S. Cl. | 250/51.5, 250/49.5 |
|---|---|---|
| [51] | Int. Cl. | G01n 23/22 |
| [50] | Field of Search | 250/49.5(8), 51.5 |

[56] References Cited
UNITED STATES PATENTS

| 2,837,655 | 6/1958 | Lang | 250/51.5 |
|---|---|---|---|
| 3,353,020 | 11/1967 | Bennett et al. | 250/51.5 |
| 3,411,000 | 11/1968 | Schliephake et al. | 250/51.5 |

*Primary Examiner*—William F. Lindquist
*Attorney*—Edwin E. Greigg

ABSTRACT: A mechanism in a fully focusing X-ray spectrometer for adjusting the width of the detector slit to an optimal value as the analyzer crystal is rotated during the spectrometric process. The analyzer crystal, the detector slit and the detector are mounted on a detector arm. The width of the detector slit is defined by the space (viewed from the analyzer crystal) between two screening members affixed to a pulley in a diametrically opposed relation. Said pulley is rotatably connected with another pulley being at a constant distance therefrom and being secured to the analyzer crystal. A relative rotation of the analyzer crystal with respect to the detector arm is transmitted as a rotation of the same extent to the pulley carrying the screening members.

APPARATUS FOR VARYING THE DETECTOR SLIT WIDTH IN FULLY FOCUSING X-RAY SPECTROMETERS

BACKGROUND OF THE INVENTION

X-ray spectrometers in general comprise an X-ray source, a detector, a detector slit and an analyzer crystal, the latter being rotated through a determined angle during the spectrometric process. The X-ray source, the center of the analyzer crystal and the focus of the monochromatic rays reflected from the analyzer crystal lie on a Rowland circle having a radius $R$. The lattice planes of the analyzer crystal have a radius of curvature of $2R$. The distance $b$ between the X-ray source and the center of the analyzer crystal is computed from the diffraction angle $\theta$ of the rays impinging on the analyzer crystal and from the radius $R$ of the Rowland circle. Thus, $b = 2R \sin \theta$ In a fully focusing X-ray spectrometer, the distance between the center of the analyzer crystal and the focus also has a value $b$.

As the analyzer crystal is rotated about its center during the spectrometric process, the distance between the source and the analyzer crystal has to change; the distance between the center of the analyzer crystal and the focus changes accordingly. If the detector slit is to be located at all times at the focus, the detector should be moved in accordance with the displacement of the focus. This means that the detector arm to which the detector is secured and which extends from the analyzer crystal has to change in length. This, in turn, requires mechanism which takes up substantial space and involves guidance problems. Such mechanism, therefore, may be incorporated in the aforenoted spectrometers only with great difficulty, if at all.

If, on the other hand, no provision is made to change the position of the detector in the longitudinal direction of the detector arm, then the focus of the monochromatic rays may lie at the detector slit only if the analyzer crystal is in a certain position. If such a stationary detector slit is used and is dimensioned such that in each position of reflection it allows the reflected rays to be passed through entirely, then the signal-to-noise ratio of the monochromatic rays to be tested will be unfavorable since, in general, the optimal slit width is smaller than its required maximal value. If a slit of optimal width is used, only the useful radiation, that is, the monochromatic rays, are admitted to the detector. It follows that if it is desired to work with a detector slit of optimal width at all times during the spectrometric process, said width has to vary as the analyzer crystal is rotated.

OBJECT AND SUMMARY OF THE INVENTION

It is the principal object of this invention to provide a mechanism, particularly in fully focusing X-ray spectrometers, for the automatic setting of the slit width to an optimal value at all times during the spectrometric process.

Briefly stated, there is provided a first pulley mounted on a detector arm and carrying an analyzer crystal. Spaced at a constant distance from the first pulley and operatively connected therewith there is provided a second pulley also mounted on the detector arm and fixedly supporting two diametrically opposed upstanding cylinders. The space between said cylinders as viewed from the analyzer crystal defines the width of the detector slit. A rotation of the analyzer crystal and said first pulley through an angle $\theta$ is transmitted to the detector arm as a rotation of $2\theta$. The relative rotation of angle $\theta$ between the analyzer crystal and the detector arm is transmitted from the first pulley to the second pulley which thus also rotates through an angle $\theta$. Consequently, the position of the cylinders on said second pulley is changed, resulting in a change of the slit width as viewed from the analyzer crystal.

The invention will be better understood and other objects as well as advantages will become more apparent from the ensuing detailed specification in conjunction with the drawings.

DESCRIPTION OF THE PREFERRED EMBODIMENT

Figure 1:
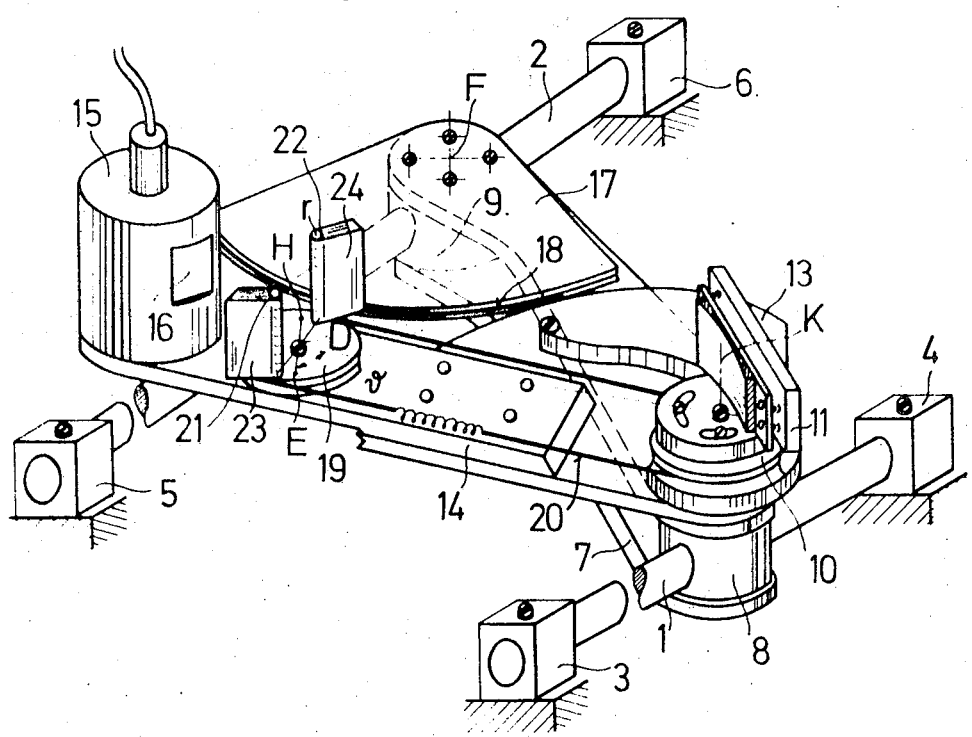
FIG. 1 is a perspective view of the preferred embodiments.

Turning now to FIG. 1, there are provided two spaced, converging guide rails 1 and 2 fixedly held in position by respective end blocks 3, 4 and 5, 6.

An arm 7 is slidably mounted on guide rails 1 and 2 by means of bearing blocks 8 and 9. Arm 7, when displaced along the rails 1 and 2, rotates relative to bearing block 8 about axis $K$ and relative to bearing block 9 about axis $F$. To arm 7, above bearing block 8, there is fixedly and concentrically secured a pulley 10 which carries a crystal holder 11. To holder 11 there is affixed an analyzer crystal 12, the reflecting face of which extends diametrically across the upper face of pulley 10. Axis $K$ passes through the center of the reflecting face of the analyzer crystal 12.

On bearing block 8 there is mounted a sector 13 fixedly carrying a detector arm 14 to the end of which, remote from analyzer crystal 12, there is secured a detector 15 having an inlet window 16 facing the analyzer crystal 12. Since detector arm 14 and sector 13 are fixedly secured to one another, the effective length of arm 14 extends to axis $K$.

To the bearing block 9 there is fixedly secured another sector 17 dimensioned identically to sector 13. The arcuate edge of sector 17, similarly to that of sector 13, has a groove to receive a cable 18 attached by its ends to sectors 13 and 17.

To detector arm 14 there is fixedly secured a pulley 19 having a center $D$. Pulley 19 has a diameter equal to that of pulley 10 and is connected thereto by means of an endless cable 20. To pulley 19 there are secured two upstanding, diametrically opposed screening members or cylinders 21, 22, each having a radius $r$.

The space between the cylinders 21, 22, as viewed from the analyzer crystal 12, defines the detector slit and its effective width $EH$.

To each of cylinders 21, 22 there is secured a respective lateral shield 23, 24 extending away from the center $D$ of pulley 19. The purpose of the shields is to prevent entry of scattered rays through detector window 16.

By virtue of the aforedescribed mechanism, a rotation of the analyzer crystal 12 during the spectrometric process causes a rotation of pulley 19 and thus effects a change in the slit width $EH$. Before, however, the operation of the device is described in detail, the considerations regarding the desired extent of rotation of pulley 19 and the dimensioning of cylinders 21, 22 will be set forth with reference to FIG. 2.

Figure 2:
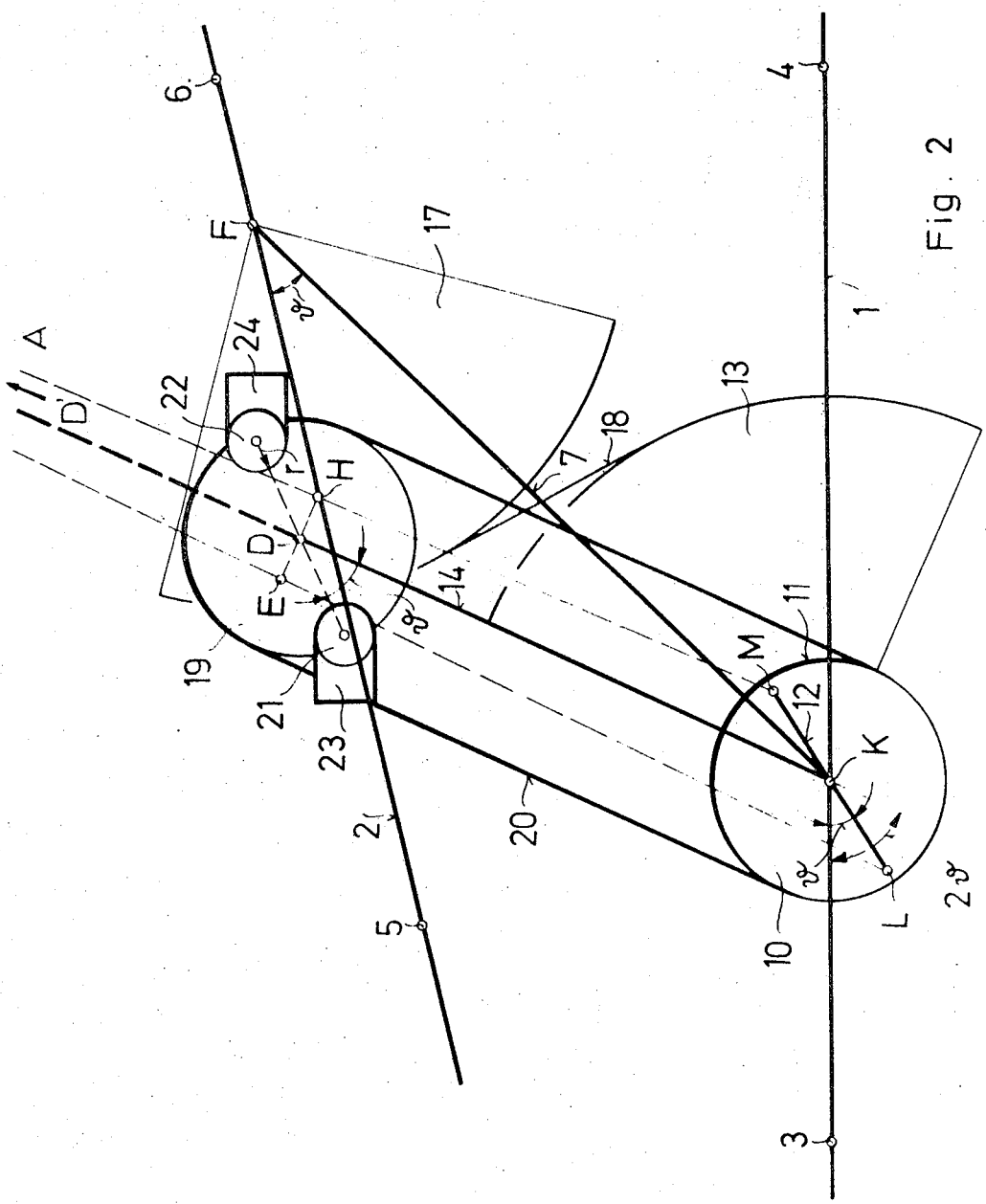
FIG. 2 is a diagram including parts of the preferred embodiment in schematic plan view.

The effective detector slit width $EH$ should be so adjusted that for any angular position of analyzer crystal 12 the slit should let through all useful rays. These rays are focused by the analyzer crystal 12 in $D'$ which lies on line $KD$. In the diagram of FIG. 2 the focus $D'$ is located beyond the borders of the drawing as indicated by the arrow $A$. Two boundary rays $LD'$ and $MD'$ are shown in broken lines. It is noted that the angle formed by $ED'$ and $HD'$ equals the angle formed by $LD'$ and $MD'$.

It is assumed that the analyzer crystal 12 has been rotated through an angle $\theta$.

Due to the smallness of the angle $\theta$, it follows that $EH:DD' = LM \sin \theta : KD'$.

Since $DD' = KD' = KD$ and further $KD' = 2R \sin \theta$.

the following equation may be written:

$EH = LM \sin \theta -$ $$KD = \frac{LM}{2R}$$

, where $R$ is the radius of the Rowland circle and $LM$ is the length of analyzer crystal 12.

In view of the fact that the distance LM is small relative to the distance KD, this condition may be met with a rotatable detector slit.

For the diameter of cylinders 21, 22, the centers of which lie on pulley 19 on a circle of diameter LM, the following equation applies:

$2r = KD \cdot LM : 2R$

It is to be noted that should the analyzer crystal 12 assume a position at the extreme left end of rail 1 at block 3 and should there the diffraction angle $\theta$ have its smallest value, the X-ray spectrometer should focus the monochromatic X-rays in point D. For all other positions the focus D' is behind D, thus the distance KD is smaller than the distance KD'.

OPERATION OF THE PREFERRED EMBODIMENT

During the spectrometric process the arm 7 is caused to slide a certain distance along guide rails 1 and 2. Since guide rails 1 and 2 are disposed at an angle with respect to one another, during its sliding motion the arm 7 rotates relative to bearing blocks 8 and 9. The rotation of arm 7 about axis K of bearing block 8 through an angle $\theta$ causes a rotation of angle $\theta$ of the analyzer crystal 12, the pulley 10 and detector arm 14 relative to guide rail 1. By virtue of the linear displacement of crystal 12, the focusing circle of the spectrometer, as known, shift for each angular setting of crystal 12.

The detector arm 14 is turned through an additional angle $\theta$ by means of sectors 13, 17 and the interconnecting cable 18. This additional rotation is effected as follows:

As the bearing block 9 slides along guide rail 2, the sector 17 slides therewith as a unit. Since the arm 7 turns with respect to bearing block 9, there will be a relative rotation of angle $\theta$ of sector 17 with respect to arm 7 about axis F. This relative rotation is transmitted to sector 13 by means of cable 18. Thus, sector 13, together with detector arm 14 which is secured thereto, also executes a turn through angle $\theta$. As a result, while the analyzer crystal rotates through an angle $\theta$ relative to rail 1, the detector arm 14 rotates through an angle $2\theta$ relative to rail 1.

In view of the foregoing there is a relative rotation through an angle $\theta$ between the analyzer crystal 12 and the detector arm 7. This relative rotation is transmitted by means of cable 20 from pulley 10 to pulley 19 which, as a result, also rotates through an angle $\theta$ about its center D.

As pulley 19 is rotated, the cylinders 21, 22 change position, resulting in a change of the width EH of the detector slit in accordance with the precedingly discussed relationship.

I claim:

1. In a fully focusing X-ray spectrometer of the type having an X-ray source, an analyzer crystal, a detector and means defining a detector slit, the improvement comprising, in combination:
   A. a detector arm on a first end of which there is mounted said analyzer crystal and on a second end of which there is mounted said detector;
   B. a first pulley means mounted on said first end of said detector arm, said analyzer crystal and said detector arm adapted to rotate relative to one another about the center of said first pulley means;
   C. a second pulley means mounted on said detector arm between said detector and said analyzer crystal at a constant distance from said first pulley means;
   D. means operatively connecting said first and second pulley means;
   E. means for linearly displacing said crystal simultaneously with the rotary motion thereof; and
   F. a pair of screening means fixedly secured to said second pulley means in a diametrically opposed relationship, said screening means defining said detector slit, and the space between said screening means as viewed from said analyzer crystal defining the width of said detector slit, a relative rotation of a determined angle between said analyzer crystal and said detector arm adapted to be transmitted from said first pulley means as a rotation of identical angle to said second pulley means causing a change in the position of said screening means varying thereby said width of said detector slit as viewed from said analyzer crystal.

2. The improvement as defined in claim 1 including rotating means for turning said detector arm through an angle twice the magnitude of the angle through which said analyzer crystal is rotated during the spectrometric process.

3. The improvement as defined in claim 2, wherein said rotating means includes:
   A. a first and second stationary linear guide rail disposed in spaced, converging relation to one another;
   B. a first and a second bearing block slidably mounted on said first and second guide rail, respectively, said first bearing block is disposed adjacent to and concentrically with said first pulley means;
   C. a rigid arm pivotally connected by its ends to said first and second bearing blocks, said analyzer crystal and said detector arm adapted to rotate through an angle $\theta$ when said bearing blocks are displaced along a determined distance on said rails;
   D. a first sector mounted concentrically with said first pulley means and fixedly connected with said detector arm;
   E. a second sector fixedly attached to said second bearing block; and
   F. means connecting said first and said second sectors, said first and second sectors cause a rotation of said detector arm through an additional angle $\theta$ when said bearing blocks are displaced along said determined distance.

4. The improvement as defined in claim 1, wherein said screening means includes two parallel spaced cylinders secured to said second pulley means in diametrically opposed relation.

5. The improvement as defined in claim 4, wherein each of said cylinders has a constant, identical diameter.

6. The improvement as defined in claim 5, wherein said constant, identical diameter is defined by the fraction $KD \cdot LM / 2R$ where KD is the distance between the centers of said first and said second pulley means, LM is the length of the reflecting face of said analyzer crystal disposed diametrically with respect to said first pulley means and also the distance between the centers of said two cylinders and R is the radius of the Rowland circle of said spectrometer.

7. The improvement as defined in claim 4, wherein each of said cylinders is provided with a shield extending away from the center of said second pulley means.

PO-1050
(5/69)

UNITED STATES PATENT OFFICE
CERTIFICATE OF CORRECTION

Patent No. 3,566,111      Dated February 23, 1971

Inventor(s)      Bruno Harm

It is certified that error appears in the above-identified patent and that said Letters Patent are hereby corrected as shown below:

Col. 2, line 66, the equation should read
$$DD' = KD' - KD$$

Col. 2, line 70, the equation should read
$$EH = LM \sin \theta - \frac{KD - LM}{2R}$$

Col. 3, line 7, the equation should read
$$2r = KD \cdot LM : 2R$$

Col. 4, line 51, the equation should read
$$\frac{KD \cdot LM}{2R}$$

Signed and sealed this 7th day of September 1971.

(SEAL)
Attest:

EDWARD M. FLETCHER, JR.
Attesting Officer

ROBERT GOTTSCHALK
Acting Commissioner of P